United States Patent [19]

Kanda

[11] Patent Number: 5,005,080
[45] Date of Patent: Apr. 2, 1991

[54] METHOD AND APPARATUS OF IMAGE PROCESSING

[75] Inventor: Masao Kanda, Tokorozawa, Japan

[73] Assignee: Pioneer Electronic Corporation, Tokyo, Japan

[21] Appl. No.: 193,744

[22] Filed: May 13, 1988

[30] Foreign Application Priority Data

May 15, 1987 [JP] Japan .............................. 62-118236
Jun. 4, 1987 [JP] Japan .............................. 62-140694
Jun. 5, 1987 [JP] Japan .............................. 62-141013

[51] Int. Cl.$^5$ ............................................. H04N 5/14
[52] U.S. Cl. ................................... 358/160; 358/183
[58] Field of Search ..................... 358/22, 160, 183; 360/11.1

[56] References Cited

U.S. PATENT DOCUMENTS 4,080,626 3/1978 Hurst et al. ........................ 358/160
4,133,009 1/1979 Kittler et al. ...................... 360/11.1
4,214,263 7/1980 Kaiser .................................. 358/22

Primary Examiner—John W. Shepperd
Assistant Examiner—Michael D. Parker
Attorney, Agent, or Firm—Fleit, Jacobson, Cohn, Price, Holman & Stern

[57] ABSTRACT

An image processing apparatus generates an after-image effect by using a first memory in which one field of digital composite video signal selected from every 4 fields is stored successively and a second memory in which one field of the digital composite video signal which is the same as any one field of the field group stored in the first memory is stored successively, and combining the field outputted from the first memory and the field output from the second memory together. An image processing method according to the invention includes the steps of dividing a picture into a plurality of regions, writing image data of each point of the plurality of regions into each corresponding memory locations of a memory only during periods selected, for each of the plurality of regions, from periods of the cycle of four fields. Another method according to the invention is characterized by writing image data of each point in at least one of the plurality of regions into each each memory locations of the memory only during the period of one field selected from periods of successive n-fields (n is a natural number equal to or greater than 2).

6 Claims, 9 Drawing Sheets

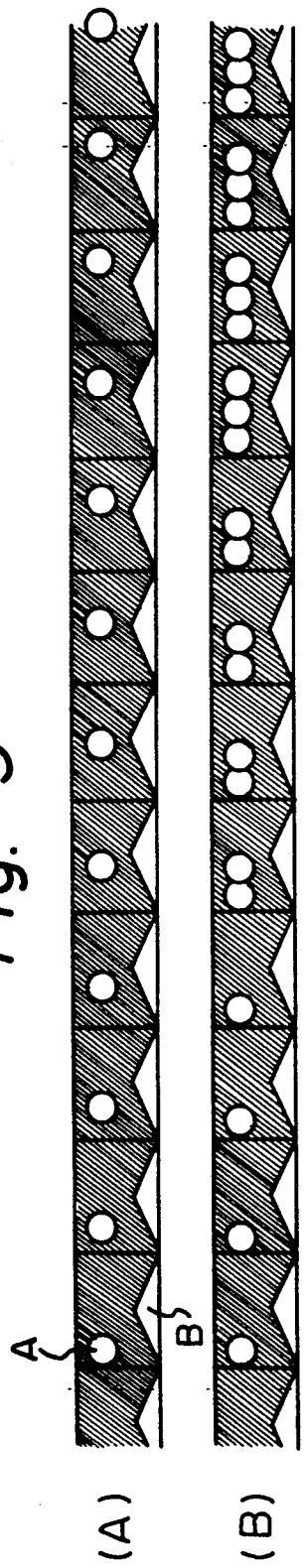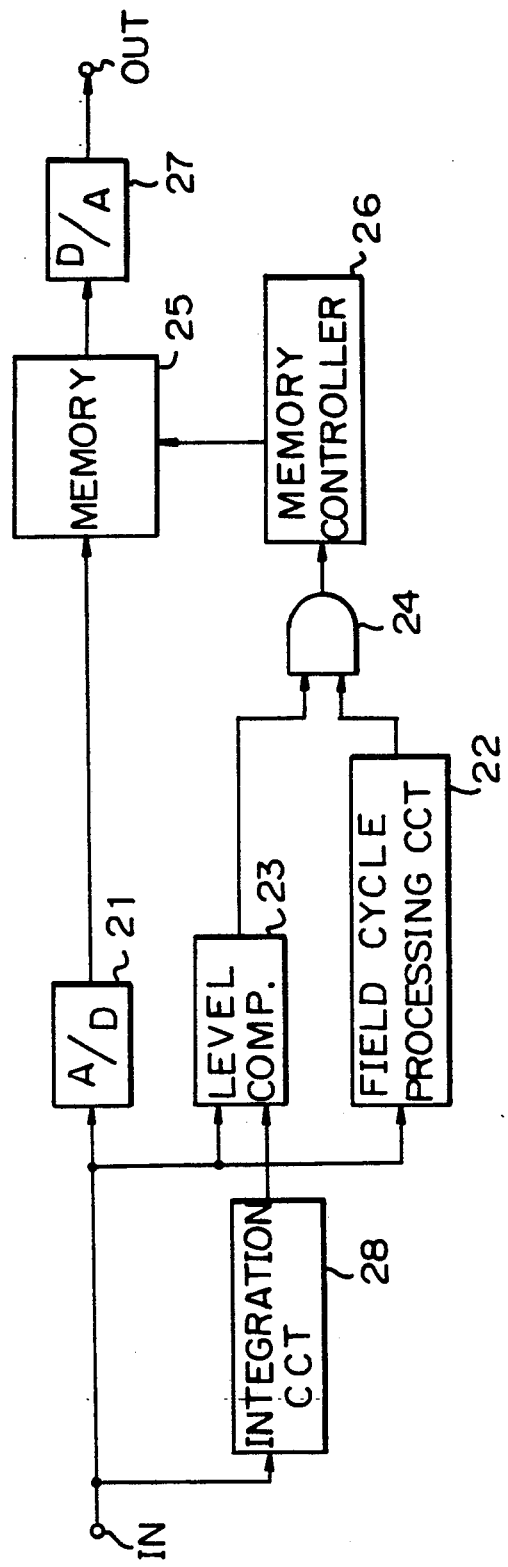
Fig. 5
Fig. 6

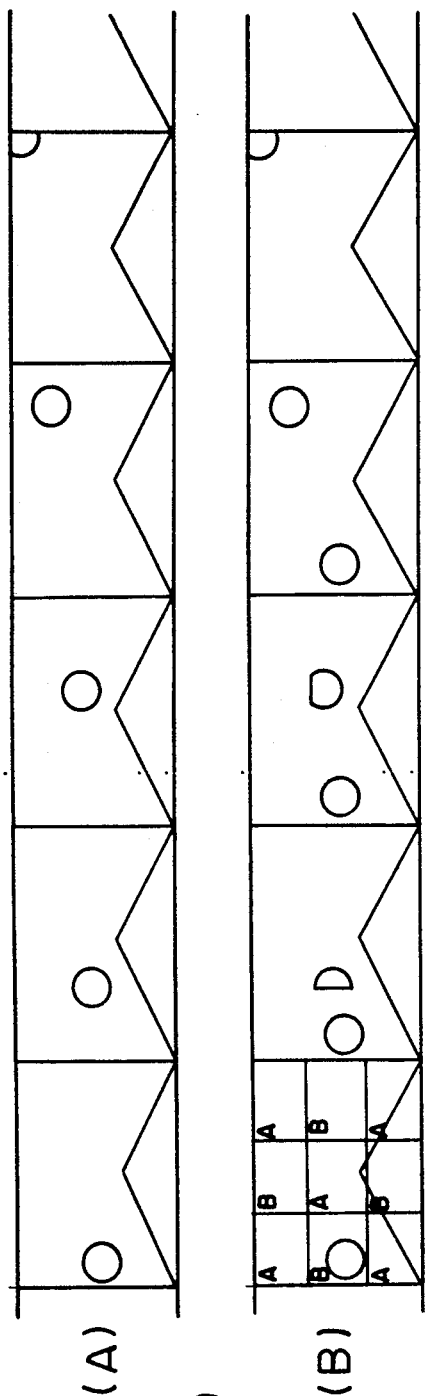
Fig. 10
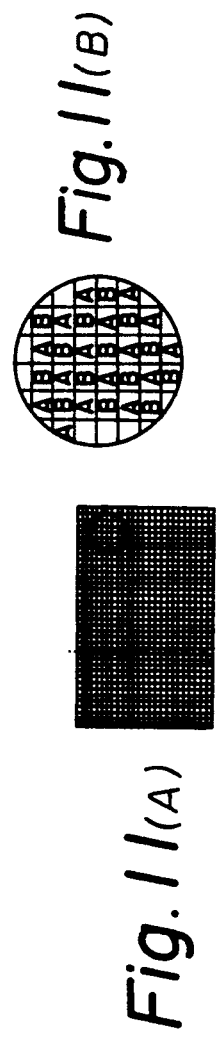
Fig. 11(A)
Fig. 11(B)
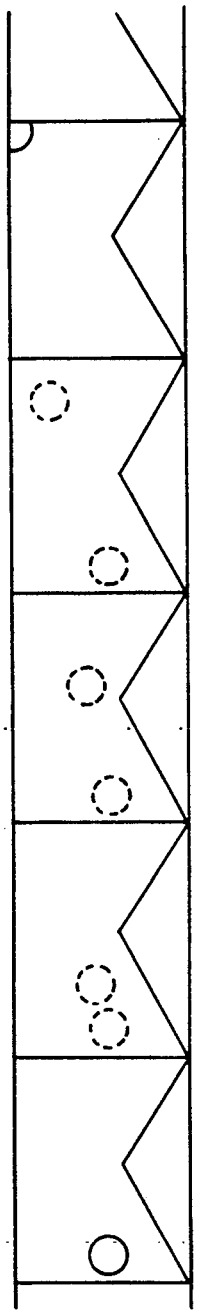
Fig. 12

METHOD AND APPARATUS OF IMAGE PROCESSING

BACKGROUND OF THE INVENTION

1. Field of the Invention

The present invention relates to an image processing apparatus adapted for generating reproduced images with special effects, and also to an image processing method, especially to a method in which image processing operations are performed by using memory.

2. Description of Background Information

Conventionally, it was necessary to use an image processing apparatus having a complex construction in order to produce special effects in color pictures, especially to produce an after-image effect.

On the other hand, image-processing operations such as the size-reduction, and the enlargement of an image, or the generation of movement of image, can be performed in the following manner for instance. At first a video signal is digitized, and is stored into a memory, and the digitized video signal is read-out from the memory by designating addresses which are different from those used at the time of writing.

Furthermore, the after-image effect can be obtained by writing only parts of a video signal representing images with movement into the memory and outputting the said parts and the other parts which were already stored, in combination. In order to obtain the after-image effect, it is conceivable to detect the portion of the video signal corresponding to an object with movement, and to write only this portion. However, with this method, it is necessary to separately provide a memory for storing data of one field long for example, in order to detect the portion which has moved, thereby creating a problem that the structure of system becomes complicated.

On the other hand, the frequency of the color subcarrier signal of the video signal in NTSC system for example, is set at a frequency as indicated by the following equation, in which the frequency of horizontal synchronization is expressed by $f_H$, and the frequency of vertical synchronization is expressed by $f_V$:

$$f_{sc} = \frac{455}{2} f_H = \frac{455}{2} \cdot \frac{525}{2} f_V = \frac{455 \times 525}{4} f_V \quad (1)$$

Therefore, if the composite video signals written in arbitrary periods are combined and outputted, that will result in the loss of the continuity of the color subcarrier signal in the output video signal, so that color pictures can not be properly obtained.

On this account, an image processing apparatus as shown in FIG. 1, designed for producing color pictures properly, was devised.

In this figure, a composite video signal is supplied to a Y-C separation circuit 1 so that it is separated into a luminance signal Y and a color signal C. The luminance signal Y is, after being converted to a digital signal by means of an A/D converter 2, supplied to a memory 3. The color signal C is supplied to a color demodulator 4, in which color difference signals R-Y and B-Y are demodulated. These color difference signals R-Y and B-Y are converted to digital signals by means of A/D converters 5 and 6 respectively, and subsequently supplied to the memory 3.

The memory 3 is controlled variously by operations such as the address control by means of a memory controller 7, and the digitized luminance signal Y, color difference signals R-Y, B-Y are written into the memory 3. The luminance signal Y, the color difference signals R-Y and B-Y, after read-out from the memory 3, are supplied to D/A converters 8, 9 and 10, so that those signals are converted to analog signals. The color difference signals R-Y and B-Y, after being converted to the analog form, are supplied to a modulator 11', in which a color subcarrier signal is modulated, to form the color signal C. This color signal C is supplied to an adder circuit 12', in which the luminance signal Y supplied from the D/A converter 8 are added thereto, so that a composite video signal is produced.

In the above explained circuit, there are drawbacks that the construction of the apparatus is complicated, and the quality of the picture is degraded after passing through the demodulation circuit and the modulation circuit.

OBJECT AND SUMMARY OF THE INVENTION

An object of the present invention is therefore to provide an image processing apparatus by which an after-image effect can be obtained in color pictures, with a simple construction.

Another object of the present invention is therefore to provide an image processing method in which an after-image effect can be obtained without causing the degrading of the quality of picture, by using a simple circuit construction.

A further object of the present invention is therefore to provide an image processing method by which an after-image effect can be obtained by means of a system having a simple construction.

An image processing apparatus according to the present invention comprises an A/D converting means for digitizing an input composite video signal, a first memory means for storing sequentially one field of an obtained digital composite video signal out of every four fields of said digital composite video signal and outputting a stored content sequentially in the order of storing, a second memory means for storing sequentially a field which is identical with any one field of a field group stored in said first memory means and outputting a stored content sequentially in the order of storing, and a D/A converting means for combining the fields outputted from the first and second memory means, and outputting an analog composite video signal.

An image processing method according to the present invention is characterized by dividing a picture whose image is formed by a composite video signal into a plurality of regions, and performing the writing of image data of each point of the plurality of regions into each corresponding memory locations of a memory only during periods which are selected, for each of the plurality of regions, from a plurality of periods present at the cycle of four fields.

An image processing method according to another aspect of the present invention is characterized by dividing the picture in which image is formed by a video signal into a plurality of regions, and performing the writing of image data of each point of in at least one of the plurality of regions into each memory location of said memory only during the period of one field selected from successive n (n being a natural number equal to or greater than 2) fields.

BRIEF DESCRIPTION OF THE DRAWINGS

FIG. 5 is a diagram showing the operation of the system of FIG. 3;

FIG. 6 is a block diagram showing an arrangement in which another embodiment of the image processing method according to the present invention is applied;

FIG. 10 is a diagram showing the operation of the system of FIG. 9;

FIGS. 11(A) and 11(B) are diagrams showing another example of the manner of dividing of the picture;

FIG. 12 is a diagram showing the operation of the system of FIG. 9 which is attained when the picture is divided as shown in FIG. 11;

DETAILED DESCRIPTION OF PREFERRED EMBODIMENTS

An embodiment of the present invention will be described with reference to FIG. 2 of the accompanying drawings hereinafter.

Figure 1:
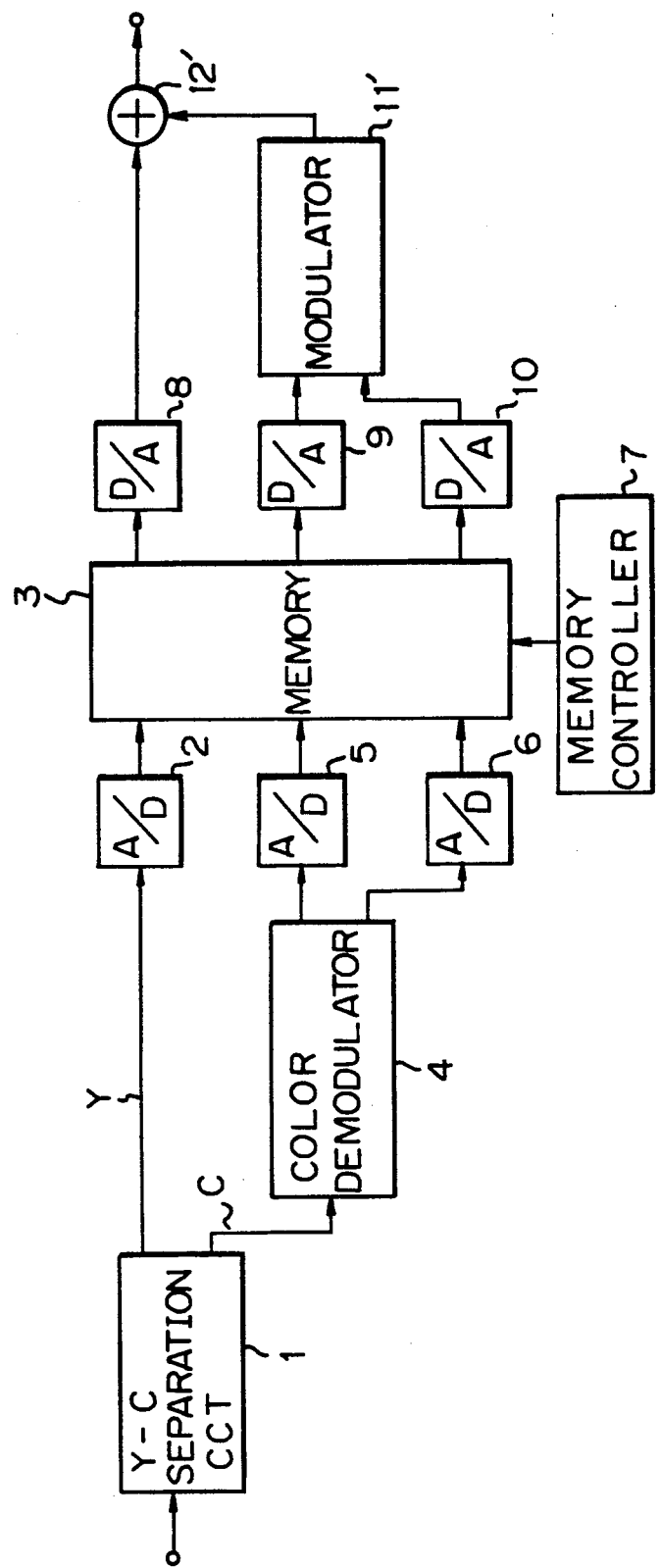
FIG. 1 is a block diagram showing an example of conventional picture processing apparatus.
Figure 2:
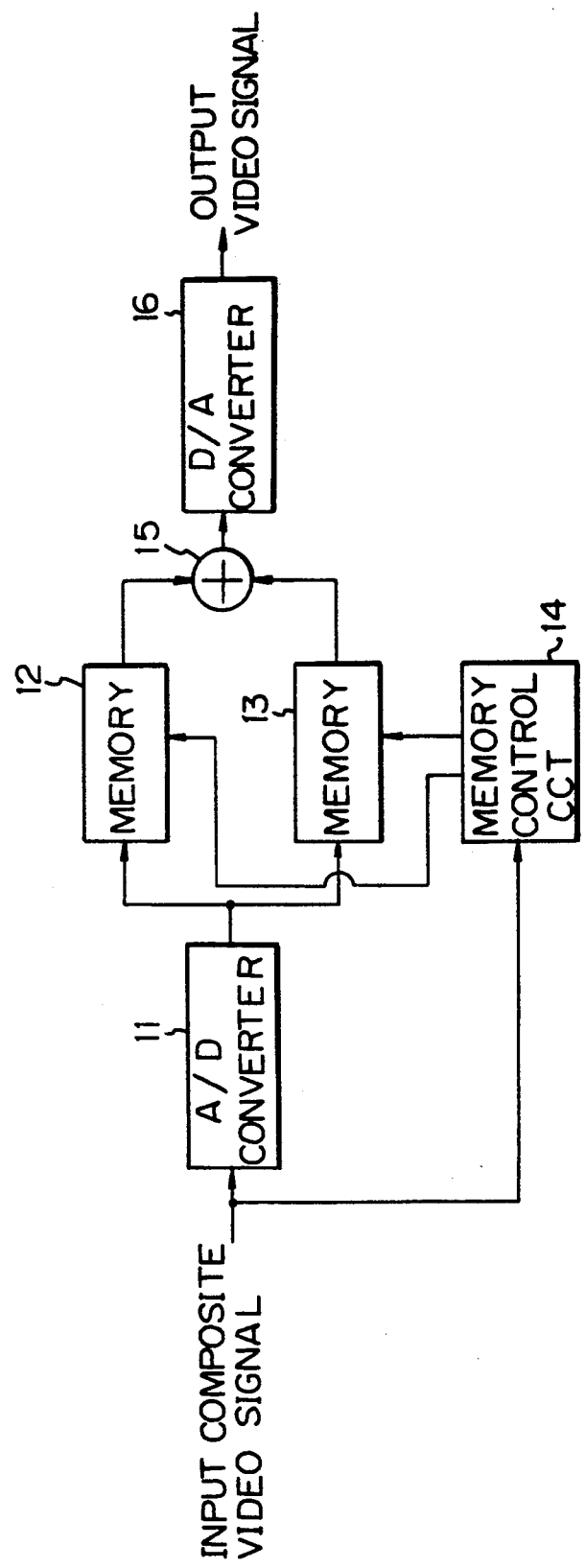
FIG. 2 is a block diagram showing an embodiment of an image processing apparatus according to the present invention.

In an image processing apparatus illustrated in FIG. 2 as an embodiment of the present invention, a composite video signal is supplied to an A/D converter 11. The composite video signal is converted, for example, into an 8-bit digital composite video signal at predetermined timings by means of the A/D converter 11. An output signal of the A/D converter 11 is supplied to first and second memories 12 and 13. The writing and reading of digital signals into and from the first and second memories 12 and 13 are controlled by means of a memory control circuit 14. The first and second memories 12 and 13 have memory locations corresponding to a segment of the digital composite video signal of one field long. Digital composite video signals respectively read-out from the first and second memories 12 and 13 are added to each other at an adder 15, and in turn supplied to a D/A converter 16. An output composite video signal of the D/A converter 16 forms an output signal of this image processing apparatus.

In the above construction, the composite video signal is supplied to the A/D converter 11, in which the input signal is processed by the A/D conversion, and in turn supplied to the first and second memories 12 and 13. In response to the horizontal and vertical synchronizing signals of the input composite video signal, the memory control circuit 14 generates write command pulses for the first memory 12 at predetermined timings for the period of one field in every four fields, and generates write command pulses for the second memory 13 at predetermined timings for the one field period in every 16 fields, to write the same fields as those written in the first memory 12. The memory locations of the first and second memories 12 and 13 are designated to be varied at predetermined timings by means of the address counter (not shown). In the first memory 12, the digital composite video signal outputted from the A/D converter 11 is written, at a rate of one field for every four fields. In the second memory 13, the digital composite video signal outputted from the A/D converter 11 is written, at a rate of one field for every 16 fields. Also, the memory control circuit 14 generates read pulses for the first and second memories 12 and 13 at predetermined timings, so that contents of the memory locations which have been designated in accordance with the output signal of the address counter, are read-out respectively. The read-out digital composite video signals are added at the adder 15, and the combined signal is supplied to the D/A converter 16.

The digital composite video signal read-out from the first memory 12 forms data in which each of pictures of one field for every four fields of the input composite video signal continues for the period of four fields, so that pictures changing at a rate of 15 fields per second are obtained. Therefore, the thus obtained pictures can be regarded as pictures with movement. On the other hand, the digital composite video signal read-out from the second memory 13 forms data in which a picture of one field long in every 16 fields of the input composite video signal continues for the period of 16 fields. Thus, the obtained pictures can be regarded as a still picture.

The frequency fsc of subcarrier signal of the input composite video signal in the NTSC system can be expressed as the equation (1) as mentioned before. Since the color signal is transmitted by the frequency interleaving system, the color signals in the adjacent two fields are opposite in phase with each other (the phase angle is separated by 180 degrees). Therefore, the video signals of one field long from every four fields are in-phase with each other, and what is called "color fields" are identical with each other, so that the video signals can be combined without causing any adverse effect on the color signal components.

Accordingly, color fields of data of the picture with motion and data of the still pictures are identical with each other, and a proper color picture can be obtained by combining these data. Therefore, a composite video signal having the after-image effect obtained by combining the pictures with movement and a still picture is outputted from the D/A converter 16.

In the embodiment described above, the image processing apparatus is constructed such that the digital video signals read-out from the first and second memories 12 and 13 are combined by means of the adder 15, and the combined digital signal is processed by the D/A conversion. However, it is also possible to arrange the apparatus such that the digital signals are processed by the D/A conversion at first, and subsequently added together.

Furthermore, in the above embodiment, the field which is identical with any one field from the four fields stored in the first memory means are stored in the second memory means. However, the arrangement is not limited to this, and it is sufficient that the field which is identical with any one field from a field group stored in the first memory means are stored in the second memory, so that the data read-out from the first memory means is used as data of pictures with movement, and the data read-out from the second memory means is used as data of still pictures. For instance, the field which is identical with any one field from 8 fields stored in the first memory means are stored in the second memory means. Moreover, it is not necessary that the field stored in the first memory means are always stored into the second memory means at constant intervals of a plurality of fields.

As described hereinabove, in the picture processing apparatus according to the present invention, the composite video signal is directly digitized and any one field for every four fields of digital composite video signal is stored into a first memory means, and the field which is identical with any one field of the field group stored in the first memory means are stored in the second memory means, and memorized contents are read-out from the first and second memory means and combined with each other. Therefore, a composite video signal having after-image effect is obtained by using a simple construction.

The embodiments of the image processing method according to the present invention will be explained with reference to the drawings hereinafter.

Figure 3:
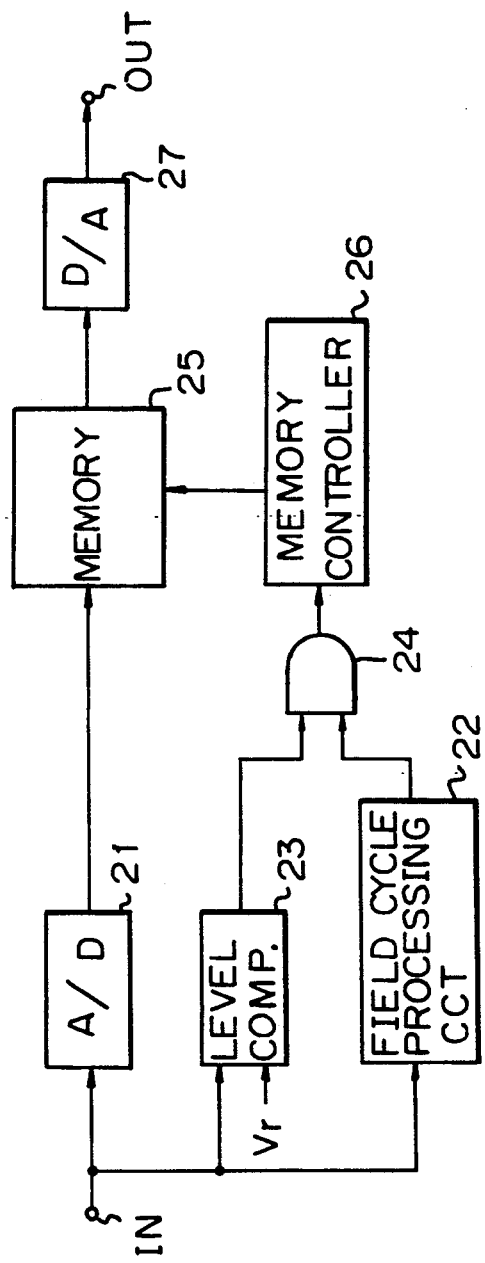
FIG. 3 is a block diagram showing an arrangement in which an image processing method according to the present invention is embodied.

In FIG. 3 which illustrates an arrangement in which the method according to the present invention is applied, a composite video signal is supplied to an A/D (Analog to Digital) converter 21, a field cycle processing circuit 22, and a level comparator circuit 23 through an input terminal IN. In the A/D converter 21, the sampling of the composite video signal is performed at a predetermined sampling frequency, and image data corresponding to the obtained sampled values is generated. The image data outputted from the A/D converter 21 is supplied to a memory 25. The memory 25 has, for example, a memory capacity capable of storing an entire image data generated during the period of one field, and has a plurality of memory locations corresponding to each point, or pixel, of a picture in which image is formed by the composite video signal.

Figure 4:
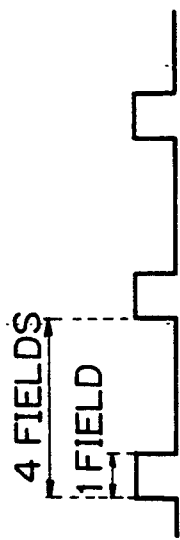
FIG. 4 is a waveform diagram showing an output signal of the field cycle processing circuit 22 in the system of FIG. 3.

The field cycle processing circuit 22 is constructed to generate positive going pulses such as shown in FIG. 4 each of which is generated at every four fields, and has a pulse width corresponding to the period of one field. The output pulses of this field cycle processing circuit 22 are supplied to one input terminal of a two-input AND (logical product) gate 24. To the other input terminal of the AND gate 24, there is supplied an output signal of the level comparator 23. The level comparator 23 is constructed to compare the level of the composite video signal with a reference level Vr, and produces a high level signal when the reference level Vr is exceeded by an instantaneous level of the composite video signal.

The output signal of the AND gate 24 is supplied to a memory controller 26. The memory controller 26 performs control operations for the memory 25 so that the image data successively supplied to the memory 25 is in turn stored into the corresponding memory location, and the recorded data in each of the memory location of the memory 25 is successively read-out in a predetermined order. In this memory controller 26, the high level signal outputted from the AND gate 24 is made to operate as a write command signal, and the writing of the image data into each memory location of the memory 25 is performed when the high level signal is outputted from the AND gate 24.

The image data read-out from the memory 25 is supplied to a D/A converter 27 in which the image data is converted to an analog signal, and in turn supplied to the output terminal OUT, so as to be transmitted to a video playback apparatus such as a color video monitor.

With the above construction, the operation of each part will be explained by way of an example in which the composite video signal corresponding to pictures such as shown in FIG. 5 (A) is supplied for a period of 12 fields.

We assume that the reference level Vr supplied to the level comparator circuit 23 is set to be lower than instantaneous levels of portions of the composite video signal corresponding to the bright regions A and B, and to be higher than the instantaneous levels of the portions of the composite video signal corresponding to the background region, or a region other than the regions A and B. Then, when the portions of the composite video signal corresponding to the bright regions A and B are supplied to the level comparator circuit 23, the high level output signal is outputted from the level comparator circuit 23, so that a high level signal is cyclically generated from the AND gate 24 for the period of one field at the cycle of four fields. On the other hand, when the portions corresponding to the region other than the regions A and B are supplied to the level comparator circuit 23, the output signal of the comparator circuit 23 will be at the low level, and the output of the AND gate 24 turns to the low level.

Since the writing of the image data into each memory location of the memory 25 is enabled only when the high level signal is generated from the AND gate 24, the writing of the image data of each point of the bright regions A and B into the corresponding memory locations of the memory 25 is performed only during the period of one field in the period of successive four fields. In addition, since the region A is moving, new image data will not be written into memory locations in which the image data of each point of the region A was written before the movement of the region A. As a result, a picture with the after-image such as shown in FIG. 5 (B) is obtained. On the other hand, since the image data of portions forming the after-image is written cyclically at every four fields simultaneously, the continuity of the phase of the color subcarrier signal between the portion forming the after-image and the other portions is maintained, so that an excellent reproduction of color is enabled.

In addition, although the pictures of three fields in the period of four fields are thinned out, reproduced pictures are outputted at a rate of 15 fields per second, so that those pictures can be perceived as pictures with movement.

FIG. 6 is a block diagram showing an arrangement in which another embodiment of the image processing method according to the present invention is applied, in which the A/D converter 21, the field cycle processing circuit 22, the level comparator circuit 23, the AND gate 24, the memory 25, the memory controller 26, and the D/A converter 27 are connected in the same manner as the apparatus shown in FIG. 3. However, in this example, the reference level supplied to the level comparator circuit 23 is outputted from an integration circuit 28. To the integration circuit 28, there is supplied the input composite video signal.

With the above construction, the reference level supplied to the level comparator circuit 23 is varied in response to an average luminance level of the input composite video signal. Therefore, there is an advantage that a suitable after-image effect can be also obtained when the luminance level is high or low on the whole.

Figures 7, 8:
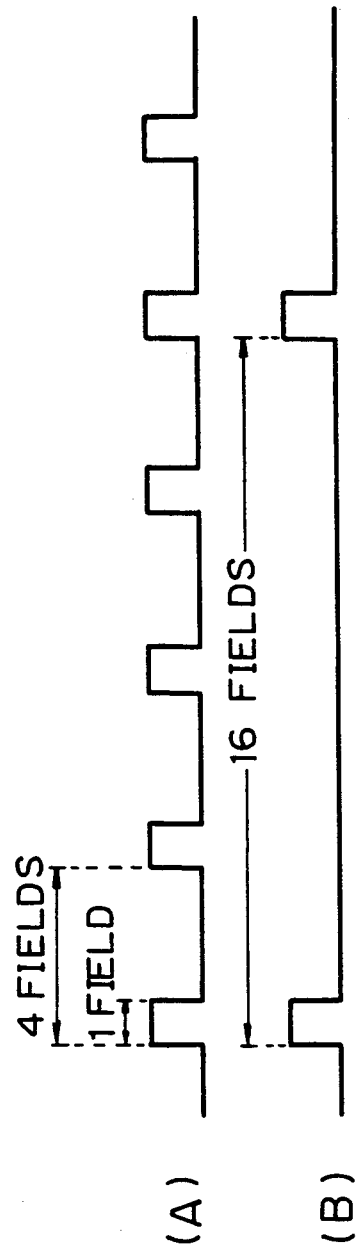
FIG. 7 is a diagram showing the manner of dividing the picture.
FIG. 8 is a diagram showing the timing of writing in each memory location of the memory corresponding to each point of the regions in the case of dividing the picture as shown in FIG. 7.

In the above embodiment, the writing of the image data of each point of the region in which the instantaneous level of the composite video signal is high is performed. However, it is also possible to arrange the system such that the image data of each point of a region in which the instantaneous level of the composite video signal is low is written. Also, in the above embodiment, the picture is divided in terms of the instantaneous level of the composite video signal. However, it is also conceivable to divide the picture into nine parts as shown in FIG. 7, and to perform the writing at the cycle of four fields as shown in FIG. 8 (A) for regions A, and to perform the writing at the cycle of 16 fields as shown in FIG. 8 (B) for regions B. It is also possible to arrange the system such that the cycle of writing for the regions A and B is varied at arbitrary intervals.

As explained in detail hereinabove, the image processing method according to one aspect of the present invention is characterized by dividing a picture, in which the image is formed by means of the composite video signal, into a plurality of regions, and performing the writing of image data of each point of the plurality of regions into corresponding memory location of a memory during periods selected, for each of the plurality of regions respectively, from a plurality of periods which are present at the of cycle four fields. Thus, the continuity of the color subcarrier signal is maintained, and the reproduction of color is performed in an excellent manner without providing the modulators and the demodulators for modulation and demodulation processes of the color signal. Thus the after-image effect can be obtained without degrading the quality of picture by using a circuit having a simple construction.

Embodiments of the image processing method according to another aspect of the present invention will be described in detail with reference to the accompanying drawings.

Figure 9:
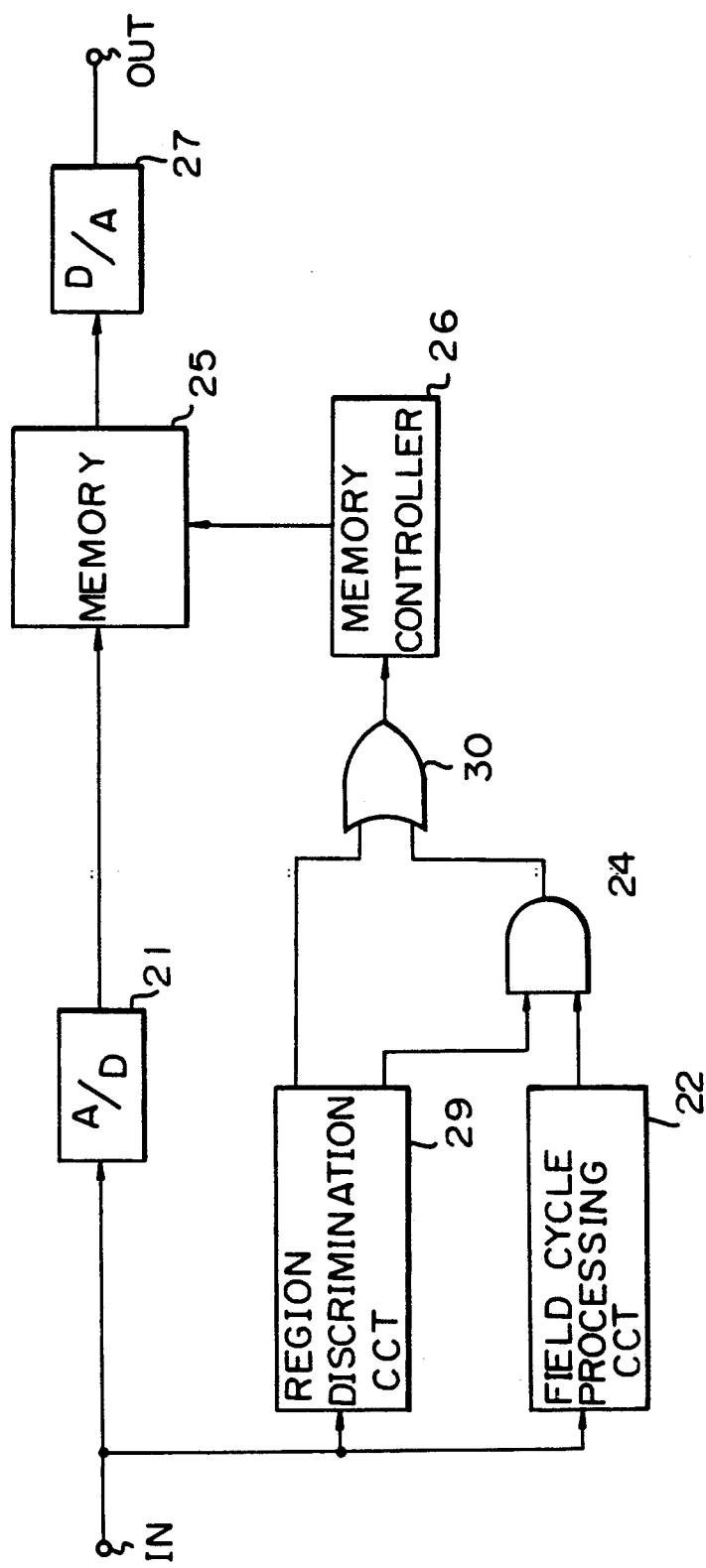
FIG. 9 is a block diagram showing an arrangement in which a further embodiment of the image processing method according to the present invention is applied.

In FIG. 9, a video signal is supplied to an A/D (anolog to Digital) converter 21, and a region discrimination circuit 29, and to a field cycle processing circuit 22 through an input terminal IN. In the A/D converter 21, the sampling of the video signal is performed at a predetermined sampling frequency, and image data corresponding to the obtained sampled value is generated. The image data supplied from this A/D converter 21 is supplied to a memory 25. The memory 25 has, fpr example, a memory capacity capable of storing all of the image data generated during the period of one field, and has a plurality of memory locations corresponding to each point, or pixel, of a picture in which image is formed by the video signal.

The region discrimination circuit 29 includes, for example, a counter which counts up a clock signal of a frequency which is the same as the sampling frequency in the A/D converter 21, and a counter which is reset by the vertical synchronizing signal in the video signal and performs up-counting in accordance with the horizontal synchronizing signal, so that it is constructed to judge as to whether the image data supplied to the memory 25 is a data of a point in regions A or a data of a point in regions B of the picture which is divided as shown in FIG. 7, by means of the output data of the counters, and to generate one of a region A signal and a region B signal, both having a high level. The region A signal generated by this region descrimination circuit 29 is supplied to an OR (logical sum) gate 30 as one input thereof. The region B signal generated by the region discrimination circuit 29 is supplied to one of input terminals of the two-input AND (logical product) gate 24. An output signal of the field cycle processing circuit 22 is supplied to the other input terminal of the AND gate 24. The field cycle processing circuit 22 is constructed to generate positive going pulses as shown in FIG. 4, each of which is generated at every four fields in accordance with the vertical synchronizing signal of the video signal, and has a pulse width corresponding to the period of one field.

The output of the AND gate 24 is supplied to the other input of the OR gate 30. The output of the OR gate 30 is supplied to the memory controller 26. The memory controller 26 performs the control of the memory 25 so that image data successively supplied to the memory 25 is in turn stored into the corresponding memory locations, and the data stored in each memory location is successively read-out in a predetermined order. In this memory controller 26, the high level signal outputted from the OR gate 30 is made to operate as the write command signal, so that the writing of the image data into each memory location of the memory 25 is enabled only during the high level signal is outputted from the OR gate 26.

The image data read-out from the memory 25 is supplied to a D/A converter 27 in which it is converted to an analog signal, and in turn supplied to an output terminal OUT, so as to be transmitted to a video display, or playback, apparatus such as a color video monitor.

In the above construction, the region A signal is outputted from the region discrimination circuit 29 when the image data of each point of the region A is supplied to the memory 25. As a result, a high level signal is outputted from the OR gate 30. When the high level signal is outputted from the OR gate 30, the writing of the image data into each memory location of the memory 25 is performed, so that the writing of the image data of each point, or pixel, of the regions A into corresponding memory location is performed at every field.

On the other hand, the region B signal is outputted from the region discrimination circuit 29 when the image data of each point of the region B is supplied to the memory 25. As a result, the high level signal is outputted from the AND gate 24 for the period of one field at the cycle of four fields. Since the output signal of this AND gate 24 is supplied to the OR gate 30, the high level signal is outputted from the OR gate 30 for the period of one field at the cycle of four fields. Therefore, the writing of the image data of each point of the region B into corresponding memory location is performed only during the period of one field for the period of successive four fields.

Therefore, if we assume that the video signal corresponding to such an image as shown in FIG. 10 (A) is supplied for the period of five fields, and the image data of each point of the region A and the regions B is written into the corresponding memory locations in the first period of one field long, then a video signal which forms moving pictures with movement having the after-image effect as shown in FIG. 10 (B) is supplied to the output terminal OUT.

In the system shown in FIG. 9, the region discrimination circuit 29 has been described to produce region signals indicating each region when the designation of address is made for the memory location corresponding to each point of each region under a case in which the picture is divided into nine regions. However, it is also possible to arrange the region discrimination circuit 29 to generate signals indicating each region under a case in which the picture is divided into small regions as shown in FIG. 11. By arranging the region discrimination circuit 29 in such a manner, the video signal forming pictures with movement such as shown in FIG. 12 is supplied to the output terminal OUT.

Figure 13:
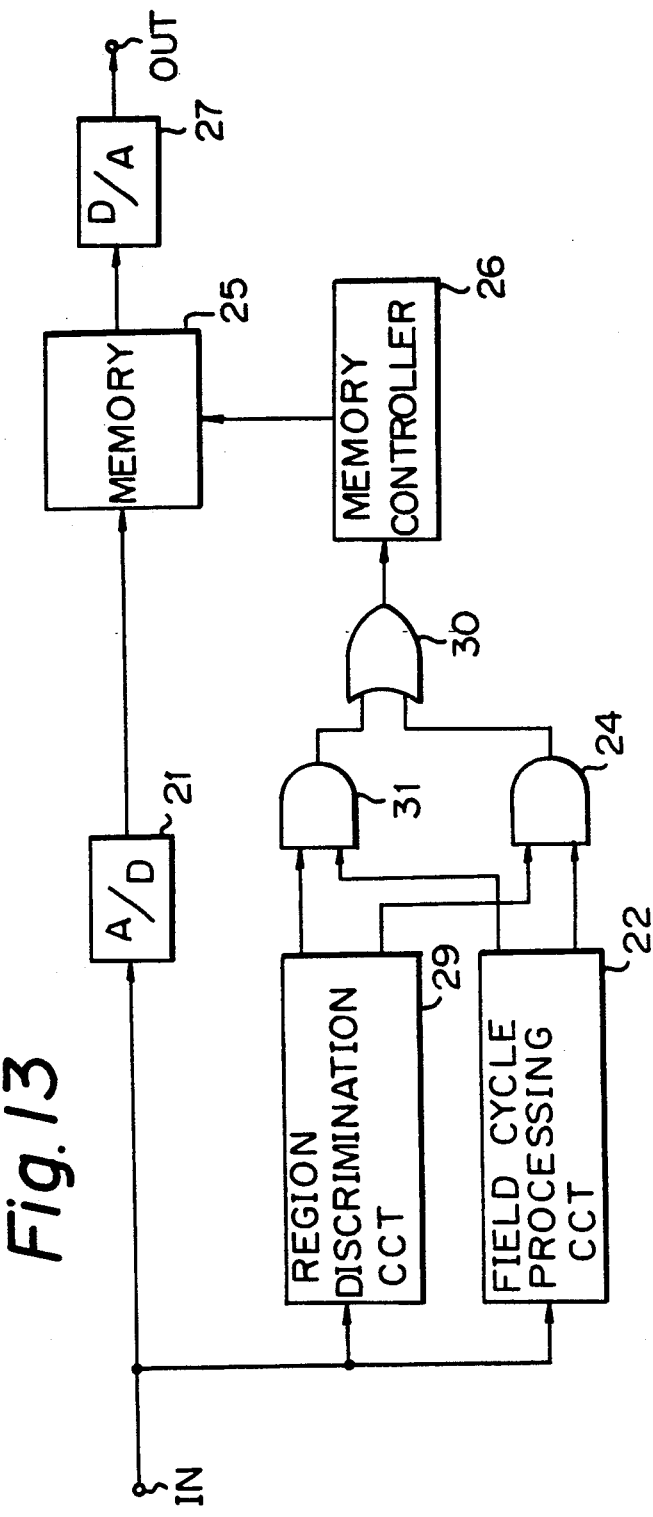
FIG. 13 is a block diagram showing an arrangement in which a still further embodiment of the image processing method according to present invention is applied.

FIG. 13 is a block diagram showing a system in which another embodiment of the image processing method according to the present invention is applied. In this figure, the A/D converter 21, the region discrimination circuit 29, the field processing circuit 22, the memory 25, the OR gate 30, the memory controller 26, the AND gate 24 the D/A converter 27 are connected in the same manner as shown in FIG. 9. However, in this figure, the first region signal outputted from the region discrimination circuit 29 is supplied to one of input terminals of a two-input AND gate 31. To the other input terminal of the AND gate 31, there is supplied the output signal of the field cycle processing circuit 22. As in the system shown in FIG. 9, the field cycle processing circuit 22 generates the pulse signal which is generated at the cycle of four fields as shown in FIG. 8 (A), and supplies it to the other input terminal of the AND gate 31, however it is constructed to generate also a pulse which is generated at the cycle of 16 fields as shown in (B) of the same figure, and supplies it to the other input terminal of the AND gate 24. The output of the AND gate 31 is supplied to the OR gate 30 as one input signal.

Also in the above construction, the after-image effect can be obtained as in the system of FIG. 9. Moreover, this system of FIG. 13 has an advantage that movements at present and in the past can be simultaneously shown as still pictures.

Figure 14:
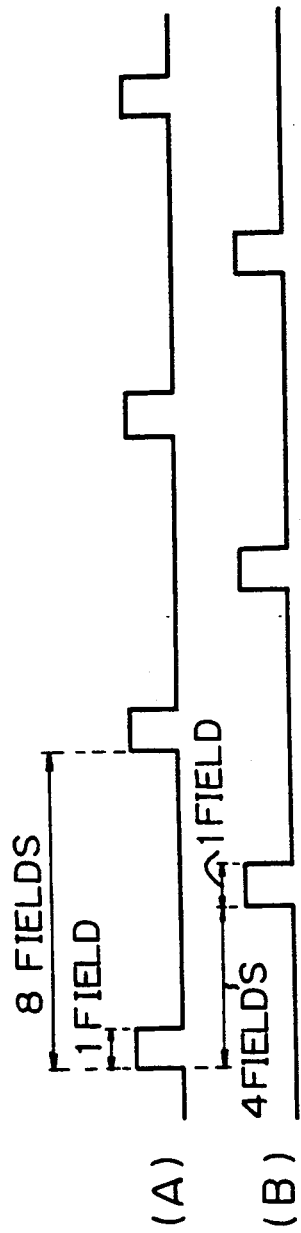
FIG. 14 is a waveform diagram showing the output signal of the field cycle processing circuit 22 in the system shown in FIG. 13.

In addition, the system shown in FIG. 13 is constructed so that the output signals are generated from the field cycle processing circuit 22 at the same cycle as shown in FIG. 14 (A) and (B), the system can be arranged so that two pulse signals having different timings of generation are outputted.

In both of the systems of FIGS. 9 and 13, the writing into the memory location of the memory 25 corresponding to each point of the regions A and B is performed at fixed timings. However, it is possible to arrange such that the timing of the writing is changed at predetermined intervals. For example, it may possible to arrange such that the writing in each memory location of the memory corresponding to each point in the regions A is performed at the cycle of 4 fields, and the writing in each memory locations of the memory 25 corresponding to each point of the regions B is performed in each one field period, in a certain period, and the writing into each memory location of the memory corresponding to each point in the regions A is performed in each one field period and the writing into each memory location of the memory 25 corresponding to each point in the regions B is performed in the period of one field in every four fields. With this arrangement, a "dynamic" portion in which the cycle of the writing is relatively fast, and a "static" portion in which the cycle of the writing is relatively slow are not fixed in the picture, so that a variety of movements can be created in the whole area of picture.

Figure 15:
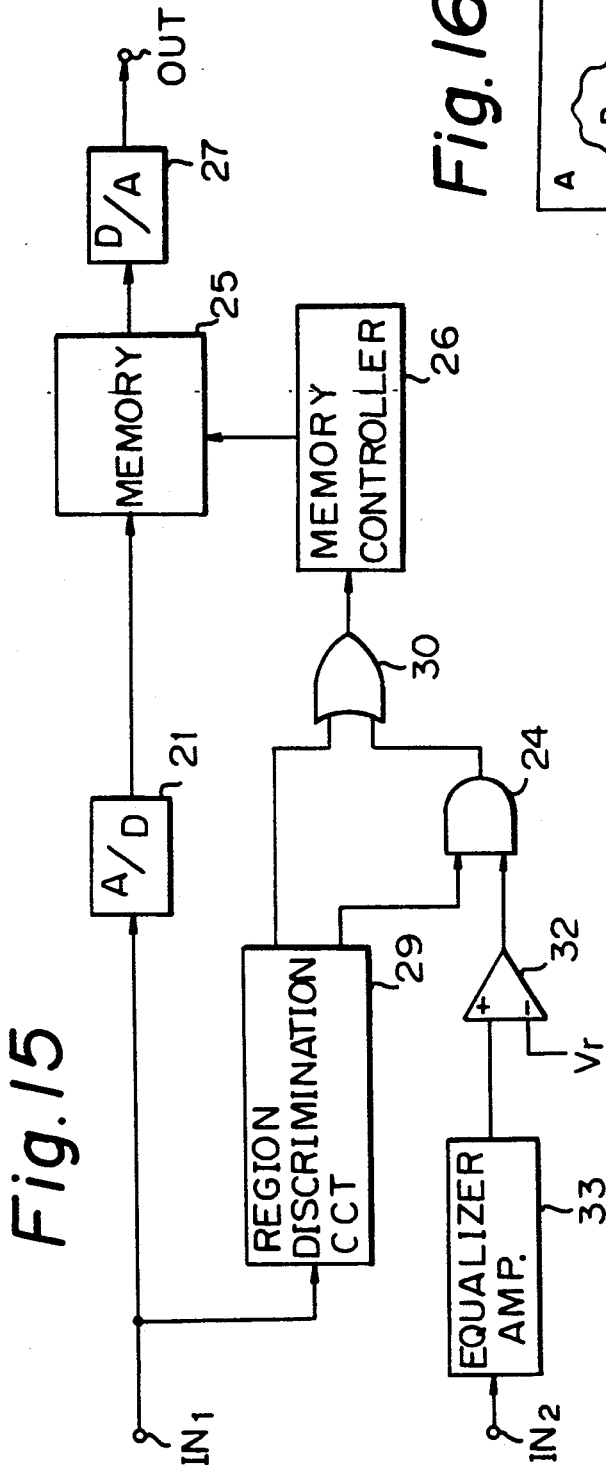
FIG. 15 is a block diagram showing an arrangement in which a still further embodiment of the image processing method according to the present invention is applied.

FIG. 15 is a block diagram showing an arrangement in which a further embodiment of the image processing method according the present invention is applied. As shown in this figure, the A/D converter 21, the region discrimination circuit 29, the memory 25, the OR gate 30, the memory controller 26, the AND gate 24, the D/A converter 27 are connected in the same manner as in the system shown in FIG. 9. However, in this embodiment, the output signal of a comparator 32 is supplied to the other input terminal of the AND gate 24. To the positive input terminal of the comparator 32, there is supplied an audio signal whose level in a predetermined frequency band is emphasized by means of an equalizer amplifier 33. The reference level Vr is supplied to the negative input terminal of the comparator 32.

With the above construction, the after-image effect is added to a picture whose associated sound is at a climax. Therefore, in the case of a software such as a promotion video in which a music program and an associated picture are recorded, the playing of the music program can be performed more effectively than a case of viewing a picture which is reproduced faithfully, because a two-dimensional change of the picture and a temporal change of the picture are added to the rhythm of music.

Figure 16:
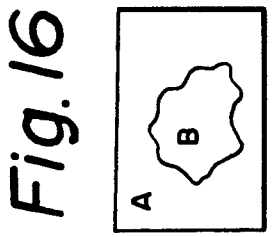
FIG. 16 is a diagram showing another example of the manner of dividing a picture.
Figure 17:
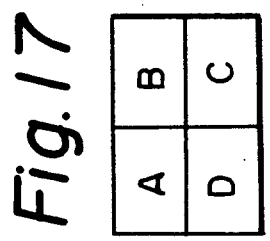
FIG. 17 is a diagram showing a further example of the manner of dividing a picture.
Figure 18:
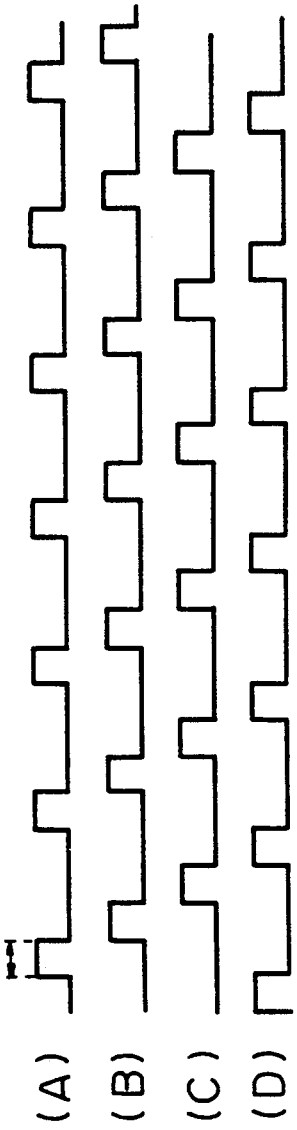
FIG. 18 is a timing chart showing the timings of writing in each regions when the picture is divided as indicated in FIG. 17.

In the above embodiments, the picture is divided in a lattice-form. However, it is also possible to divide the picture as illustrated in FIG. 16. In addition, the writing in each memory location of the memory 25 corresponding to each regions of the picture is performed at two kinds of timing. However, it is conceivable to divide the picture as shown in FIG. 17, and to set the timing of the writing in each memory location of the memory 25 corresponding to each point in regions A, B, C, and D at such timings as illustrated in FIG. 18 (A) through (D).

As explained in detail hereinabove, the picture processing method according to the another aspect of the present invention is characterized by dividing a picture in which the image is formed by a video signal into a plurality of regions, and the writing of the image data of each point of at least one of the plurality of regions into corresponding each memory location of the memory is performed only during the period of one field selected from a period of successive n (n being a natural number equal to or greater than 2) fields. Therefore, the after-image effect can be obtained by a circuit having a simple construction, without necessity of separately preparing a memory for storing image data of one field long in order to detect a moving object, for example. Furthermore, by changing the manner of division of the picture, or the timing of the writing of the image data, it becomes possible to generate a two dimensional change of the image and the time-change of the image simultaneously. Therefore, a variety of images can be obtained from a single video software.

What is claimed is:

1. An image processing apparatus comprising:
    an analog to digital converting means for digitizing an input composite video signal representing an image into a digital composite video signal, said digital composite signal comprised of a series of fields;
    a first memory means for storing said digital composite video signal;
    a second memory means for storing said digital composite video signal;
    memory control means for controlling writing and reading timings of said first and second memory means such that one field of said digital composite video signal obtained for every four fields of said digital composite video signal is sequentially written in said first memory means and a stored content of said first memory means is sequentially read out in the order of storing said digital composite signal, and one field which is identical to any one field of a field group stored in said first memory means is sequentially written in said second memory means at intervals longer than intervals of the field stored in said first memory means, and a stored content of said second memory means is read out sequentially in the order of storing said digital composite signal;
    adding means for adding together the contents of said first and second memory means; and
    a digital to analog converting means for outputting an analog composite video signal corresponding to the combined contents of said first and second memory means.

2. A method of image processing a picture in which image data obtained by sampling a composite video signal and corresponding to levels of the composite video signal of each point on a picture in which an image is formed by said composite video signal is sequentially supplied to a memory having a plurality of memory locations respectively corresponding to each point on said picture and written into said plurality of memory locations, said image data stored in said plurality of memory locations being sequentially read-out in a predetemined order to perform a desired image processing effect, said method comprising the steps of:
    dividing said picture into a plurality of regions; and
    writing image data of each point in said plurality of regions into each corresponding memory location of said memory at different times and only during a period of one field selected from a plurality of periods, said plurality of periods comprising four fields.

3. A method of image processing a picture in which image data obtained by sampling a video signal and corresponding to levels of the video signal of each point on a picture in which an image is formed by said video signal is sequentially supplied to a memory having a plurality of memory locations respectively corresponding to each point on said picture and written into said plurality of memory locations, said image data stored in said plurality of memory locations being sequentially read-out in a predetermined order to perform a desired image processing effect, said method comprising the steps of:
    dividing said picture into a plurality of regions; and
    writing image data of each point in one of said plurality of regions into each corresponding memory location of said memory at different times and only during a period of one field selected from periods of N successive fields, N being a natural number equal to or greater than 2.

4. The image processing method as set forth in claim 3, wherein the step of writing is performed for each point in a predetermined region of said plurality of regions into each corresponding memory location of said memory at a cycle of X fields, X being a natural number, and writing of each point in regions other than said predetermined region being performed at a cycle of M.X field with M being a natural number equal to or larger than 2.

5. A method of image processing a picture in which image data obtained by sampling a video signal and corresponding to levels of the video signal of each point on a picture in which an image is formed by said video signal is sequentially supplied to a memory having a plurality of memory locations respectively corresponding to each point on said picture and written into said plurality of memory locations, and subsequently, data stored in said plurality of memory locations being sequentially read-out in a predetermined order to perform a desired image processing effect, said method comprising the steps of:
    dividing said picture into a plurality of regions; and
    writing image data of each point in one of said plurality of regions into each corresponding memory location of said memory at different times and only during a period of one field selected from periods of N successive fields, N being a natural number equal to or greater than 2, said step of writing being performed for each point in a predetermined region of said plurality of regions into each corresponding memory location of said memory at a cycle of X fields, X being a natural number, and said step of writing for each point in regions other than said predetermined region being performed at a cycle of M.X fields with M being a natural number equal to or greater than 2.

6. The image processing method as set forth in claim 5, wherein the step of writing is performed so that said cycle of writing into each memory location corresponding to each point in said predetermined region and said cycle of writing into each memory location corresponding to each point in said other regions are varied alternately between said cycle of X fields and said cycle of M.X fields, at predetermined intervals.

* * * * *